(12) United States Patent
Leahy et al.

(10) Patent No.: US 9,441,336 B2
(45) Date of Patent: Sep. 13, 2016

(54) METHODS AND APPARATUS FOR MOUNTING SIGNS ADJACENT TO ROADWAYS

(75) Inventors: Matthew Edward Leahy, Auburn, IL (US); Lawrence Edward Leahy, Auburn, IL (US)

(73) Assignee: Xcessories Squared, Auburn, IL (US)

( * ) Notice: Subject to any disclaimer, the term of this patent is extended or adjusted under 35 U.S.C. 154(b) by 236 days.

(21) Appl. No.: 11/538,990

(22) Filed: Oct. 5, 2006

(65) Prior Publication Data
US 2008/0085148 A1    Apr. 10, 2008

(51) Int. Cl.
*E01F 9/00* (2016.01)

(52) U.S. Cl.
CPC .............. *E01F 9/635* (2016.02); *Y10T 403/11* (2015.01)

(58) Field of Classification Search
CPC ........................... E01F 9/0182; Y10T 403/11
USPC ....................... 403/2; 256/1, 65.14
See application file for complete search history.

(56) References Cited

U.S. PATENT DOCUMENTS

| | | | | |
|---|---|---|---|---|
| 2,775,375 A | * | 12/1956 | Haller | G01F 11/22 222/362 |
| 2,933,970 A | * | 4/1960 | Pagano | F16B 21/16 411/517 |
| 3,561,317 A | * | 2/1971 | Rowell | 411/5 |
| 3,977,646 A | * | 8/1976 | Moon | B28B 7/02 249/139 |
| 4,225,165 A | | 9/1980 | Kesselman | |
| 4,502,825 A | | 3/1985 | Yamada | |
| 4,504,180 A | | 3/1985 | Ishii et al. | |
| 4,926,592 A | * | 5/1990 | Nehls | 403/2 |
| 5,120,168 A | | 6/1992 | Padula | |
| 5,125,194 A | * | 6/1992 | Granger | E01F 9/0117 403/2 |
| 5,400,997 A | * | 3/1995 | Payne | E01F 9/0186 248/201 |
| 5,713,705 A | * | 2/1998 | Grunbichler | 411/5 |
| 5,794,910 A | * | 8/1998 | Granger | E01F 9/018 248/548 |
| 5,887,842 A | * | 3/1999 | Granger | E01F 9/018 248/548 |
| 5,957,425 A | * | 9/1999 | Conway | E01F 9/0182 248/548 |
| 6,238,155 B1 | | 5/2001 | Aukzemas et al. | |
| 6,422,783 B1 | * | 7/2002 | Jordan | E01F 9/0117 256/13.1 |
| 6,723,099 B1 | | 4/2004 | Goshert | |

FOREIGN PATENT DOCUMENTS

DE    19504349 A1 *  8/1996

* cited by examiner

*Primary Examiner* — Victor MacArthur
(74) *Attorney, Agent, or Firm* — Armstrong Teasdale LLP

(57) ABSTRACT

A signpost connector for use in coupling a sign support to an anchor includes at least one bolt having a plurality of bolt heads, wherein at least one of the plurality of bolt heads is configured to break away from the bolt when a pre-determined torque load is induced to the one bolt head.

18 Claims, 3 Drawing Sheets

METHODS AND APPARATUS FOR MOUNTING SIGNS ADJACENT TO ROADWAYS

BACKGROUND OF THE INVENTION

This invention relates generally to signposts, and more specifically to signposts for use with signs mounted adjacent to roadways.

At least some known roadway signs include an anchor that is driven into the ground, an extended support that is coupled to the anchor such that the support extends above the ground, and a sign coupled to the support. Because of their proximity to the roadway, such road signs may be a hazard for errant vehicles.

The Federal Highways Administration ("FHWA") has promulgated yielding criteria for signposts and structures that are located adjacent to designated traffic areas. The yielding criteria is intended to protect both the occupants of vehicles and to reduce property damage from collisions with these structures. For example, for small and intermediate roadside supports, the current FHWA standards require a structure that is weak enough to bend upon impact such that a vehicle may pass over the support structure with minimum deceleration. Thus, occupant interior impact may be avoided and vehicular damage can be minimized. After a collision, however, the entire roadway sign support needs to be replaced, including the anchor in many cases.

To avoid the cost of replacing the anchors after a collision, other known signposts have been designed such that the sign support shears from the anchor upon impact. As a result, with such designs, following a collision the anchor may subsequently be reused with a replacement support. Couplers machined or fabricated with pre-determined break points, such as shear bolts, have been used with some success to separate the sign support and the anchor, such that the anchor remains substantially undamaged when a vehicle collides with a signpost. However, such couplers may also be vulnerable to shearing from wind loads on a sign.

Other known sign supports are coupled to the anchor using threaded fasteners. More specifically, in such designs, the fasteners are tightened to a pre-determined torque to facilitate securely coupling the anchor and the sign support. However, properly torquing a plurality of threaded fasteners to couple the anchor to the sign support may be a difficult and time-consuming task. Moreover, because the pre-determined torque of the threaded fasteners is sometimes verified using a torque wrench, the number of tools and/or operations required to erect a roadway sign may be increased. As such, using a torque wrench to verify the torque of the threaded fasteners may increase the cost, the complexity, and/or the time it takes to erect a roadway sign.

BRIEF DESCRIPTION OF THE INVENTION

In one aspect, a signpost connector for use in coupling a sign support to an anchor includes at least one bolt having a plurality of bolt heads, wherein at least one of the plurality of bolt heads is configured to break away from the bolt when a pre-determined torque load is induced to the at least one bolt head during installation of the sign support.

In another aspect, a signpost connector for use in coupling a sign support to an anchor includes a base configured to be coupled to the anchor, wherein the base includes at least a first opening. The signpost connector also includes a sign support connector configured to be coupled to the sign support. The support connector includes at least a second opening. The signpost connector also includes at least one slip bolt for securing the base to the sign support connector. The slip bolt includes a head portion including a plurality of heads, a body extending outward from the head portion to an end portion, and a threaded portion extending from the body end portion at least partially toward the head portion. The slip bolt is sized to extend through the first and second openings. The slip bolt is configured to slip out of the first and second openings when at least one of the base, the sign support connector, the sign support, and a sign coupled to the sign support is impacted with a pre-determined separation load such that the base and the sign support connector separate at the pre-determined separation load.

In another aspect, a method is provided for assembling a signpost. The method includes positioning an anchor in the ground with respect to a grade of the ground, coupling a base having a first opening to the anchor, positioning a sign support connector adjacent the base such that the base first opening is aligned with a second opening within the sign support connector, inserting a bolt having a plurality of bolt heads through the first and second openings, and tightening a first head of the plurality of bolt heads until the first head breaks away from the bolt to thereby tighten the bolt to a pre-determined torque and thereby couple the sign support connector to the base.

In another aspect, a signpost assembly for supporting a sign includes an anchor configured to be inserted at least partially into one of the ground and a concrete footing. The anchor includes at least a first opening. The signpost assembly also includes a base including at least a second opening. The base is at least partially received within the anchor first opening. The signpost assembly also includes a sign support connector including at least a third opening, and at least one slip bolt for securing the base to the sign support connector. The slip bolt includes a head portion including a plurality of heads, a body extending outward from the head portion to an end portion, and a threaded portion extending from the body end portion at least partially toward the head portion. The slip bolt is sized to extend through the second and third openings, and is configured to slip out of the second and third openings when at least one of the base, the sign support connector, a sign support coupled to the sign support connector, and the sign coupled to the sign support is impacted with a pre-determined separation load such that the base and the sign support connector separate at the pre-determined separation load. The slip bolt head portion further includes a plurality of bolt heads, wherein at least one of the plurality of bolt heads is configured to break away from the slip bolt at a pre-determined torque load during installation of the sign support connector.

DETAILED DESCRIPTION OF THE INVENTION

Figure 1:
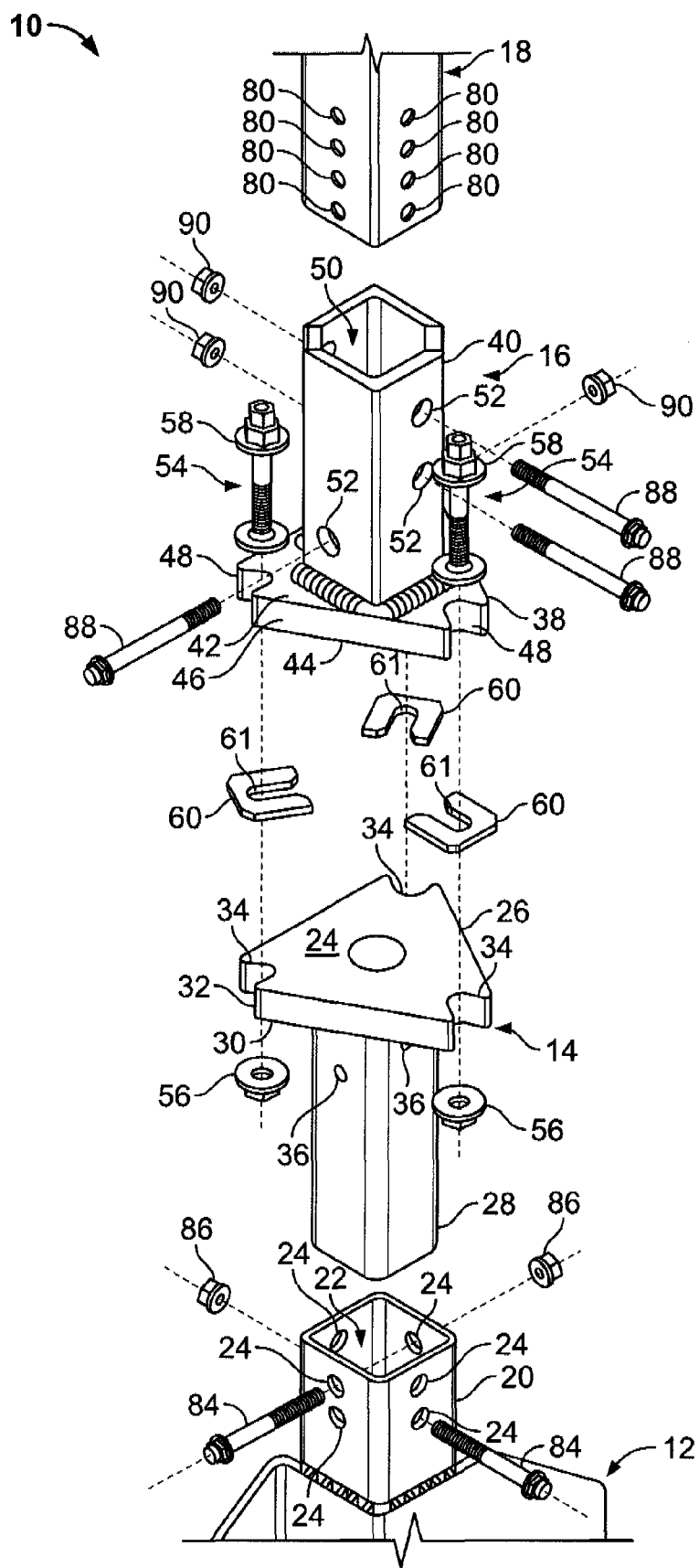
FIG. 1 is an exploded view of an exemplary signpost assembly.
Figure 2:
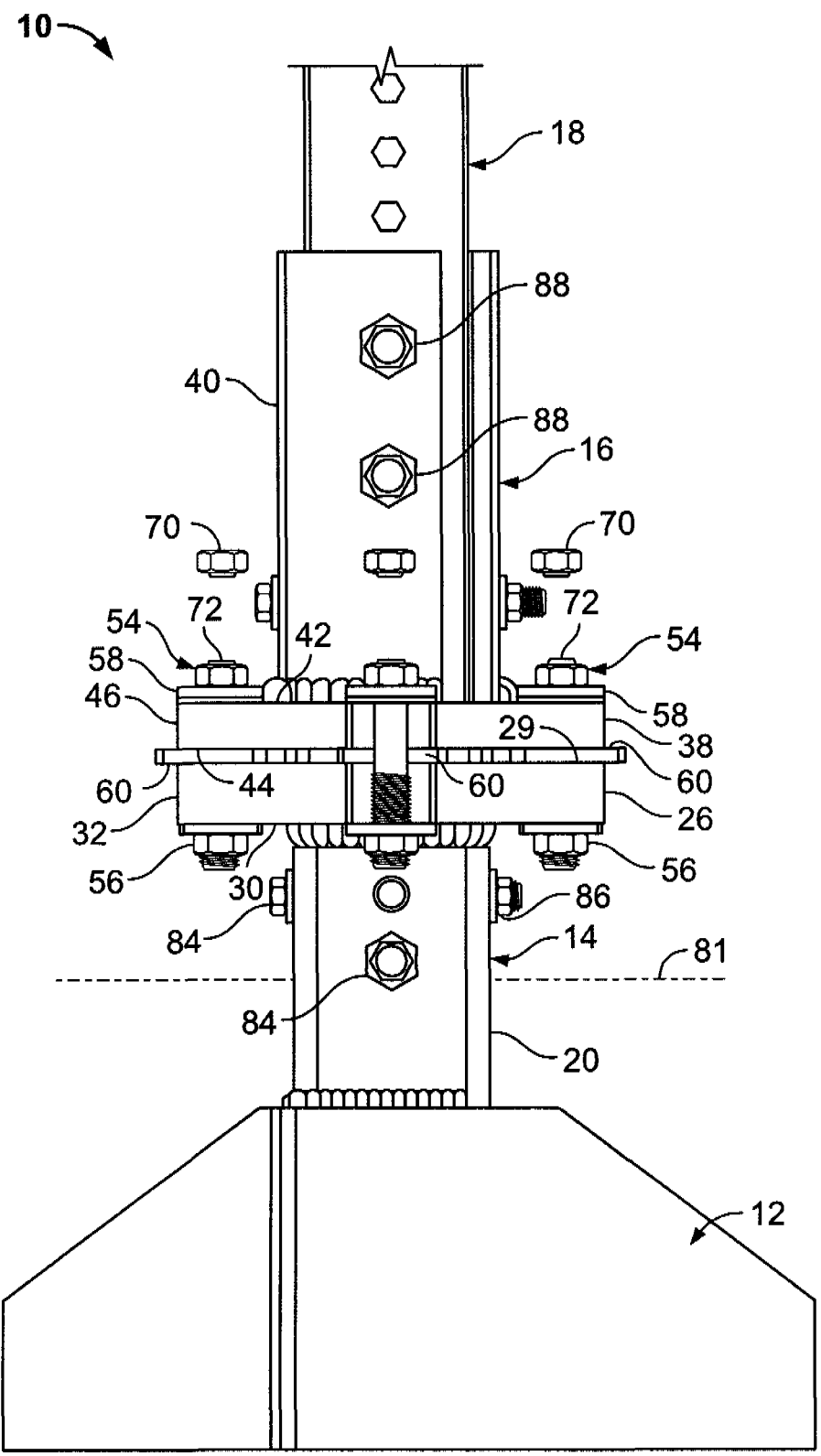
FIG. 2 is an enlarged side view of the signpost assembly shown in FIG. 1 and fully assembled.

FIG. 1 is an exploded view of an exemplary signpost assembly 10. FIG. 2 is a side view of an assembled signpost assembly 10. Signpost assembly 10 includes a ground anchor 12, a base 14, a sign support connector 16, and a sign support 18. In the exemplary embodiment, anchor 12 includes an elongated connection member 20 that has a substantially square cross-section. Alternatively, connection member 20 may have any other suitable cross-sectional shape, such as, but not limited to, a rectangular shape, an L-shape, a J-shape, a circular shape, a U-channel shape, a triangular shape, and/or a flanged beam cross-sectional shape. Connection member 20 is hollow such that an opening 22 is defined therein that is sized to receive a portion of base 14. In the exemplary embodiment, opening 22 has a generally square cross-sectional shape. However, opening 22 may include any suitable cross-sectional shape, including a cross-sectional shape that is different from the cross-sectional shape of connection member 20. Although base 14 may be coupled to anchor 12 using any suitable structure, process, and/or means, in the exemplary embodiment, anchor connection member 20 includes a plurality of openings 24 extending therethrough used for coupling base 14 to anchor 12 with a plurality of threaded fasteners 84, as will be described in more detail below. Although eight openings 24 are illustrated, anchor connection member 20 may include any number of openings 24.

Base 14 includes a connection plate 26 and an elongated connection member 28 that extends from plate 26. In an alternative embodiment, connection plate 26 may be formed integrally with anchor 12. In a further embodiment, connection 26 may be coupled to anchor 12 through welding for example. Connection plate 26 includes an upper surface 29, a lower surface 30, and a sidewall 32 extending therebetween. Upper and lower surfaces 29 and 30 are each substantially planar and are substantially parallel to each other. A plurality of openings 34 extend between upper and lower surfaces 29 and 30. Openings 34 are substantially parallel to sidewall 32 for coupling sign support connector 16 to base 14, as will be described in more detail below. Although three openings 34 are illustrated, connection plate 26 may include any number of openings 34. In the exemplary embodiment, connection plate 26 has a generally triangular shape oriented such that openings 34 are defined at each corner of the triangle. However, connection plate 26 may include any suitable shape that enlarges plate 26 to function as described herein, such as, but not limited to a rectangular shape, a circular shape, and/or a hexagonal shape. Moreover, although in the exemplary embodiment openings 34 are located at each corner of the exemplary triangular shape of connection plate 26, openings 34 may each be located on any location of connection plate 26, no matter what shape plate 26 has.

In the exemplary embodiment, connection member 28 is coupled to connection plate 26 by a weld. However, connection member 28 may be coupled to connection plate 26 using any suitable process, structure, and/or means such as, but not limited to, with an adhesive and/or threaded fasteners. Alternatively, connection member 28 and connection plate 26 may be integrally formed together.

Connection member 28 is sized and shaped to be at least partially received within opening 22 of anchor connection member 20. As such, in the exemplary embodiment, connection member 28 has a generally square cross-section. However, connection member 28 may include any suitable cross-sectional shape, such as, but not limited to, other rectangular shapes, an L-shape, a J-shape, a circular shape, a U-channel shape, a triangular shape, and/or a flanged beam cross-sectional shape. In the exemplary embodiment, base connection member 28 includes a plurality of openings 36 extending therethrough. Openings 36 are sized and oriented to be concentrically aligned with openings 24 of anchor connection member 20 to enable base 14 to be coupled to anchor 12. Although only four openings 36 are illustrated, base connection member 28 may include any number of openings 36.

Sign support connector 16 includes a connection plate 38 and an elongated connection member 40 that extends from plate 38. Connection plate 38 includes an upper surface 42, a lower surface 44, and a sidewall 46 extending therebetween. Upper and lower surfaces 42 and 44 are each substantially planar and are substantially parallel to each other. A plurality of openings 48 extend between upper and lower surfaces 42 and 44. Openings 48 are substantially parallel to sidewall 46 and may be aligned with openings 34 of base connection plate 26 to enable sign support connector 16 to be coupled to base 14, as will be described below in more detail. Although three openings 48 are illustrated, connection plate 38 may include any number of openings 48. In the exemplary embodiment, connection plate 38 has a generally triangular shape that is oriented such that openings 48 are defined at each corner of the triangle. However, connection plate 38 may include any suitable shape, including shapes that are different from that of base connection plate 26, such as, but not limited to, a rectangular shape, a circular shape, and/or a hexagonal shape. Moreover, although in the exemplary embodiment openings 48 are located at each corner of the exemplary triangular shape of connection plate 38, openings 48 may each be located on any location of connection plate 38, no matter what shape plate 38 has.

In the exemplary embodiment, connection member 40 is coupled to connection plate 38 by a weld. However, connection member 40 may be coupled to connection plate 38 using any suitable process, structure, and/or means such as, but not limited to, with an adhesive and/or threaded fasteners. Alternatively, connection member 40 and connection plate 38 may be integrally formed together.

In the exemplary embodiment, connection member 40 has a substantially square cross-sectional shape. However, connection member 40 may include any suitable cross-sectional shape, such as, but not limited to, other rectangular shapes, an L-shape, a J-shape, a circular shape, a U-channel shape, a triangular shape, and/or a flanged beam cross-sectional shape. Connection member 40 is hollow such that an opening 50 is defined therein that is shaped and sized to receive a portion of sign support 18 therein. In the exemplary embodiment, opening 50 has a substantially square cross-sectional shape. However, opening 50 may include any suitable cross-sectional shape, including a cross-sectional shape that is different from the cross-sectional shape of connection member 40, such as, but not limited to, other rectangular shapes, an L-shape, a J-shape, a circular shape, a U-channel shape, a flanged beam cross-sectional shape, and/or a triangular shape. Although sign support 18 may be coupled to sign support connector 16 using any suitable structure, process, and/or means, in the exemplary embodiment, connection member 40 includes a plurality of openings 52 extending therethrough that are used to couple sign support 18 to sign support connector 16 using a plurality of threaded fasteners 88. Although four openings 52 are illustrated, connection member 40 may include any number of openings 52.

Figure 3:
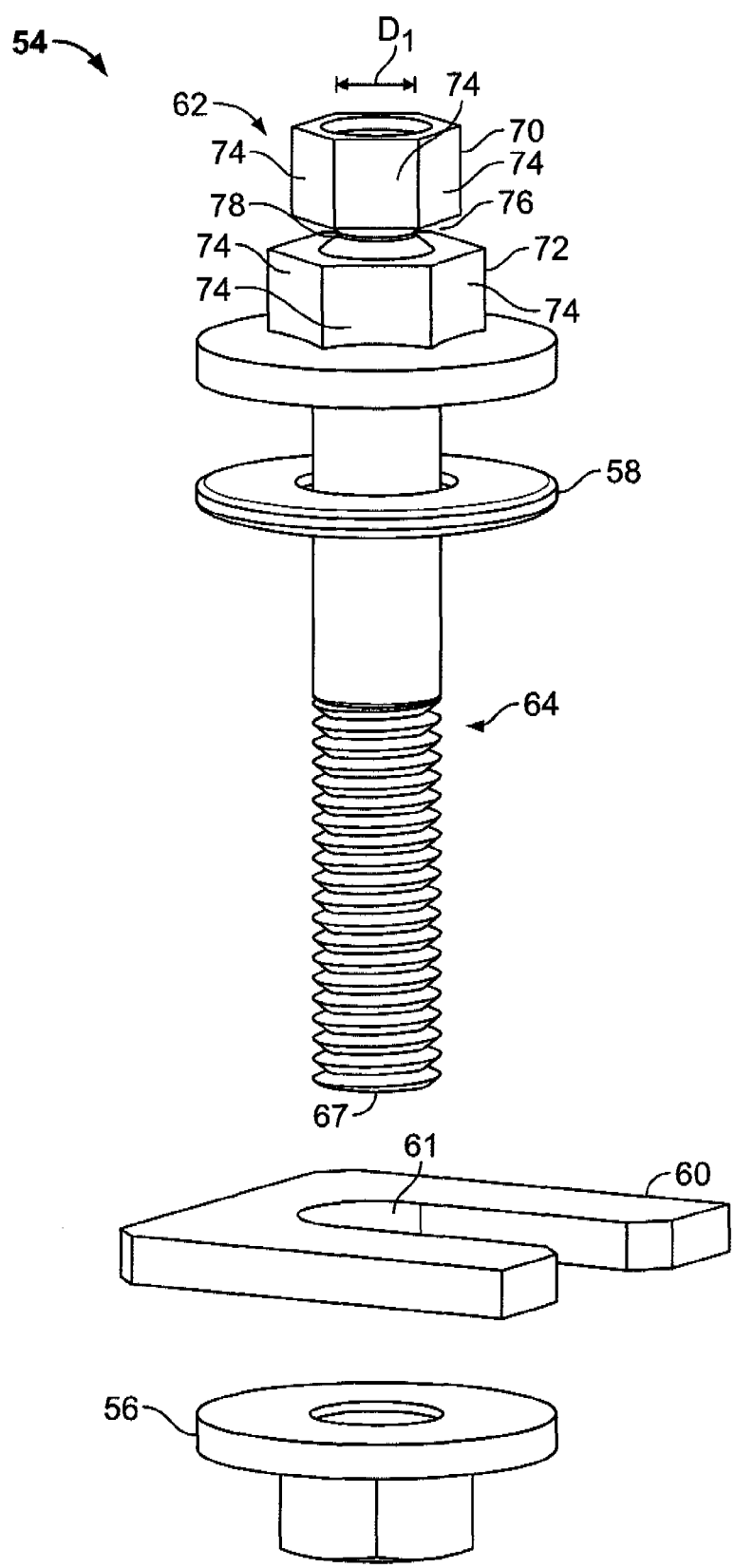
FIG. 3 is a perspective view of an exemplary slip bolt that may be used to assemble the signpost assembly shown in FIGS. 1 and 2.

FIG. 3 is a perspective view of an exemplary slip bolt 54 that may be used to couple base 14 (shown in FIGS. 1 and 2) and sign support connector 16 (shown in FIGS. 1 and 2) together. More specifically, in the exemplary embodiment, slip bolts 54 are each inserted through a respective opening 48 and through a respective opening 34, and are then threadably coupled to a nut 56 to secure base 14 and sign support connector 16 together. In the exemplary embodiment, washers 58 and 60 are used with each slip bolt 54. In some embodiments, washers 60 may be coated with a coating having a low coefficient of friction, such as, but not limited to, a TEFLON® coating. Moreover, in the exemplary embodiment, each washer 60 is formed with an elongate slot 61 that facilitates positioning washer 60 during assembly of signpost assembly 10. In one embodiment, each washer 60 may include a tapered body. Although only three slip bolts 54 are illustrated, base 14 and sign support connector 16 may be coupled together using any number of slip bolts 54.

Each slip bolt 54 includes a head portion 62 and a body 64 that extends outward from head portion 62. Body 64 includes a threaded portion 66 that extends from an end portion 67 of body 64 at least partially towards head portion 62. Head portion 62 includes a plurality of bolt heads 70 and 72. Although only two bolt heads 70 and 72 are illustrated, head portion 62 may include any number of bolt heads. Each bolt head 70 and 72 is formed with a plurality of wrench flats 74 to allow slip bolts 54 to be manipulated with standard tools, such as, but not limited to, a wrench, during assembly and/or disassembly of signpost assembly 10. Although each bolt head 70 and 72 may include any number of flats 74, in the exemplary embodiment, each bolt head 70 and 72 is generally hexagonal and includes six flats 74. Moreover, although in the exemplary embodiment each bolt head 70 is shown as having a substantially similar size and shape as each bolt head 72, in other embodiments bolt head 70 may be formed with a different size and/or shape than bolt head 72. As a safety feature, generally bolt head 70 is smaller than bolt head 72, to prevent tightening of bolt head 72 without contacting bolt head 70. A necked-down, or shear, section 76 extends between bolt head 70 and bolt head 72 of each slip bolt head portion 62. Necked-down section 76 has a generally V-shaped profile with a minimum diameter $D_1$ defined at an apex 78. Diameter $D_1$ facilitates causing bolt head 70 to breakaway and separate from bolt 54 at a pre-determined torque load. More specifically, when the pre-determined torque load is reached during tightening of slip bolt 54, necked-down section 76 will fracture at, or adjacent to apex 78 such that bolt head 70 breaks away and separates from slip bolt head portion 62. As such, slip bolts 54 can be tightened to a pre-determined torque without verification with a torque wrench (not shown). Apex 78 may have any suitable diameter $D_1$ that enables necked-down section 76 to fracture at any pre-determined torque load. For example, in some embodiments the pre-determined torque is between about 50 foot pounds and about 55 foot pounds.

In the exemplary embodiment, sign support 18 has a generally square cross-sectional shape. However, sign support 18 may include any suitable cross-sectional shape, such as, but not limited to, other rectangular shapes, an L-shape, a J-shape, a circular shape, a U-channel shape, a triangular shape, and/or a flanged beam cross-sectional shape. In the exemplary embodiment, sign support 18 includes a plurality of openings 80 extending therethrough. Openings 80 may be aligned substantially concentrically with openings 52 of connection member 40 to enable sign support 18 to be coupled to sign support connector 16 using threaded fasteners 88. Sign support 18 may include any number of openings 80.

During assembly of signpost assembly 10, initially ground anchor 12 is inserted into the ground or a concrete footing such that a portion of anchor connection member 20 extends above a grade 81 of the ground or concrete adjacent thereto. Base connection member 28 is then inserted into opening 22 of anchor connection member 20 and one or more openings 36 of base connection member is aligned with a corresponding opening 24 of anchor connection member 20. A threaded fastener 84 is then inserted within one or more pairs of aligned openings 36, 24 and tightened to secure base connection member 28 to anchor connection member 20. Although in the exemplary embodiment threaded fastener(s) 84 include a nut 86, in alternative embodiments one or more openings 24 and/or 36 are threaded for securing members 20 and 28 together using threaded fastener(s) 84.

Although anchor connection member 20 is illustrated as extending above the grade, in alternative embodiments, anchor connection member 20 is completely below the grade. Moreover, anchor connection member 20 may extend any height above the grade. For example, in some embodiments, anchor connection member 20 extends above the grade, and base connection member 28 is received within anchor connection member opening 22 such that base connection plate upper surface 29 is between about two inches and about four inches above the grade. However, base connection plate upper surface 29 may be any height above the grade.

Washers 60 are then each positioned on base connection plate 26 such that each slot 61 is aligned with a corresponding base connection plate opening 34. Sign support connector 16 is positioned on base 14 such that lower surface 44 of sign support connector connection plate 38 contacts washers 60 and such that each opening 48 of connection plate 38 is aligned with a corresponding slot 61 and a corresponding base connection plate opening 34. As such, washers 60 space apart base connection plate 26 and sign support connector connection plate 38. Washers 58 are each positioned on a corresponding slip bolt 54 and each slip bolt 54 is received into a corresponding aligned set of opening 48, slot 61, and opening 34. Each slip bolt 54 is then tightened using bolt head 70. Once each slip bolt 54 is tightened to a pre-determined torque load at which bolt head apex 78 will fracture, bolt head 70 breaks away and separates from each slip bolt 54. As such, slip bolts 54 can each be tightened to the pre-determined torque without verification with a torque wrench (not shown).

Because at least one bolt head 70 fractures at a pre-determined torque load, during assembly, no torque-checking devices, such as a torque wrench, are required during assembly of the signpost assembly 10. Accordingly, installation costs and assembly times are reduced. In addition, because no torque-checking devices are necessary, less expensive equipment may be used to assemble signpost assembly 10 and installation errors, i.e., bolts 54 being under-torqued to a value which enables bolts 54 to undesirably and premature slip out of openings 34 and 48 when exposed to wind vibrations for example, or bolts 54 being over-torqued to a value when prohibits bolts 54 from slipping out of openings 34 and 48 when exposed to the pre-determined separation load, are facilitated to be reduced or eliminated.

Sign support 18 is then inserted into opening 50 of sign support connector connection member 40 and one or more openings 80 of sign support 18 is aligned with a corresponding opening 52 of connection member 40. A threaded fastener 88 is then inserted within one or more pairs of aligned openings 80, 52 and tightened to secure sign support 18 to connection member 40. Although in the exemplary embodiment threaded fastener(s) 88 include a nut 90, in alternative embodiments one or more openings 80 and/or 52 are threaded for securing sign support 18 and connection member 40 together using threaded fastener(s) 88. Of course, some or all of the steps above could be performed in a different order. For example, sign support 18 could be coupled to connection member 40 before sign support connector 16 is coupled to base 14.

Multiple assemblies 10 could be used for large signs and signal structures.

The interconnection between connection plates 26 and 38 may facilitate a separation of sign support connector 16 from base 14 when connector 16, sign support 18, and/or a roadway sign (not shown) is impacted with a pre-determined separation load. For example, in some embodiments, when connector 16, sign support 18, and/or a roadway sign is impacted with the pre-determined separation load, each of slip bolts 54 will slip out of their respective openings 34 and 48 such that connection plates 26 and 38 separate. In some embodiments, connection plate 26 and connection plate 38 are positioned such that a pair of aligned openings 34 and 48 generally face oncoming road traffic, which may facilitate bolts 54 slipping out of openings 34 and 48 at the pre-determined separation load. Moreover, the exemplary triangular shape of connection plates 26 and 38 may facilitate bolts 54 slipping out of openings 34 and 48 at the pre-determined separation load, for example when a corner (whether openings 34 and 48 are located at the corners) generally faces oncoming road traffic. Furthermore, in some embodiments, washers 60 may facilitate bolts 54 slipping out of openings 34 and 48 at the pre-determined separation load. For example, in some embodiments a position of each of washers 60 may facilitate bolts 54 slipping out of openings 34 and 48 at the pre-determined separation load. Moreover, and for example, a coating on washers 60 may facilitate bolts 54 slipping out of openings 34 and 48 at the pre-determined separation load by reducing friction between connection plates 26 and 38.

The pre-determined separation load at which slip bolts 54 slip out of openings 34 and 48 may be any pre-determined load. For example, in some embodiments the pre-determined separation load at which slip bolts 54 slip out of openings 34 and 48 is between about 37,000 pounds nominal. In comparison to known shear bolts, i.e., bolts that typically have a weaker or thinned portion that enables the bolt to fracture when exposed to the predetermined separation load, because slip bolts 54 do not include a thinner or "necked-down" portion, bolts 54 are less likely to prematurely failure than known shear bolts as a result of wind vibration fatigue.

The above-described signpost assemblies are cost-effective and reliable. Each signpost assembly includes one or more slip bolts coupling a roadway sign to an anchor member. The slip bolts each include a plurality of bolt heads, one of which fractures at a pre-determined torque load. Because at least one bolt head fractures at a pre-determined torque load, during assembly, no torque-checking devices are necessary, installation costs and assembly times are reduced.

As such, the slip bolt(s) can be tightened to a pre-determined torque without verification with a torque wrench. As a result, the signpost assembly securely couples a sign to an anchor in a manner that is cost effective, reliable, and satisfies current FHWA yield criteria for structures located adjacent to designated traffic areas.

Exemplary embodiments of signpost assemblies are described above in detail. The assemblies are not limited to the specific embodiments described herein, but rather, components of each assembly may be utilized independently and separately from other components described herein. For example, each signpost assembly component can also be used in combination with other signpost assembly components or signpost assembly configurations.

When introducing elements/components/etc. described and/or illustrated herein, the articles "a", "an", "the", "said", and "at least one" are intended to mean that there are one or more of the element(s)/component(s)/etc. The terms "comprising", "including" and "having" are intended to be inclusive and mean that there may be additional element(s)/component(s)/etc. other than the listed element(s)/component(s)/etc.

While the invention has been described in terms of various specific embodiments, those skilled in the art will recognize that the invention can be practiced with modification within the spirit and scope of the claims.

What is claimed is:

1. A signpost connector for use in coupling a sign support to an anchor, said signpost connector comprising:
   a plurality of connection plates each comprising a set of openings that align when said connection plates are oriented relative to each other;
   a plurality of separate washers selectively positioned between said connection plates, wherein each of said washers is U-shaped and has an elongated slot selectively positioned in alignment with aligned openings defined in said connection plates; and
   a plurality of slip bolts for coupling said connection plates together at said aligned openings,
   wherein said slip bolts enable the sign support to separate from the anchor when at least one of the sign support and said signpost connector is impacted with a separation load, and
   wherein said elongated slots are selectively oriented inwardly towards a common central axis to facilitate causing said slip bolts to slip out of said aligned openings in response to the separation load.

2. A connector in accordance with claim 1 wherein each said slip bolt comprises a plurality of bolt heads and a shear section extending between two of said bolt heads, said shear section comprising an apex and a minimum diameter at said apex to facilitate enabling said slip bolt to fracture at one of said apex and adjacent to said apex when a pre-determined torque load is induced to one of said two bolt heads.

3. A connector in accordance with claim 1 wherein each said slip bolt comprises a plurality of bolt heads.

4. A connector in accordance with claim 3 wherein each of said bolt heads comprises at least one wrench flat.

5. A connector in accordance with claim 3 wherein said plurality of bolt heads comprises a first bolt head and a second bolt head, said first bolt head breakable away from said second bolt head when a pre-determined torque load is imparted to said first bolt head, said second bolt head shaped to facilitate disassembly of the sign support from the anchor by applying a rotational force to said second bolt head after said first bolt head has broken away.

6. A connector in accordance with claim 5 wherein the pre-determined torque load is between about 50 foot pounds and about 55 foot pounds.

7. A connector in accordance with claim 5 wherein each said slip bolt comprises a shear section extending between said first and second bolt heads, said shear section comprising an apex and a minimum diameter at said apex to facilitate said slip bolt fracturing at one of said apex and adjacent said apex at the pre-determined torque load.

8. A connector in accordance with claim 1 further comprising a nut selectively coupled to each said slip bolt for securing said connection plates together.

9. A connector in accordance with claim 1 further comprising a sign support opening.

10. A connector in accordance with claim 9 further comprising a fastener for securing the sign support within said opening.

11. A connector in accordance with claim 1 further comprising a connection member and a fastener for coupling said connection member to the anchor.

12. A signpost assembly for supporting a sign, said signpost assembly comprising:
an anchor;
a base selectively coupled to said anchor, said base comprising a first connection plate;
a sign support connector comprising a second connection plate selectively coupled to said first connection plate, said connection plates each comprising a set of openings that align when said connection plates are oriented relative to each other;
a plurality of separate washers selectively positioned between said connection plates, wherein each of said washers is U-shaped and has an elongated slot selectively positioned in alignment with aligned openings defined in said connection plates; and
a plurality of slip bolts for securing said base to said sign support connector at said aligned openings,
wherein said slip bolts are sized to extend through said aligned openings, such that said slip bolts slip out of said aligned openings when a separation load is imparted to said sign support connector such that said base and said sign support connector separate, and wherein said elongated slots are selectively oriented inwardly towards a common central axis to facilitate causing said slip bolts to slip out of said aligned openings in response to the separation load.

13. An assembly in accordance with claim 12 wherein each said slip bolt comprises a first bolt head and a second bolt head, said first bolt head breakable away from said second bolt head when a pre-determined torque load is imparted to said first bolt head, said second bolt head shaped to facilitate disassembly of said base from said sign support connector by applying a rotational force to said second bolt head after said first bolt head has broken away.

14. An assembly in accordance with claim 13 wherein the pre-determined torque load is between about 50 foot pounds and about 55 foot pounds.

15. An assembly in accordance with claim 13 wherein each said slip bolt comprises a shear section extending between said bolt heads, said shear section comprising an apex and a minimum diameter at said apex to facilitate said slip bolt fracturing at one of said apex and adjacent said apex at the pre-determined torque load.

16. An assembly in accordance with claim 12 further comprising a nut selectively coupled to each said slip bolt for securing said base to said sign support connector.

17. An assembly in accordance with claim 12 wherein said sign support connector comprises at least one sign support opening.

18. An assembly in accordance with claim 12 wherein said base comprises a connection member sized for insertion into said anchor.

* * * * *